United States Patent [19]

Riffe et al.

[11] 4,426,682
[45] Jan. 17, 1984

[54] FAST CACHE FLUSH MECHANISM

[75] Inventors: Josephus Riffe, Plantation; Rajiv Sinha, Boca Raton, both of Fla.

[73] Assignee: Harris Corporation, Melbourne, Fla.

[21] Appl. No.: 266,139

[22] Filed: May 22, 1981

[51] Int. Cl.³ .............................................. G06F 13/00
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,541,529 | 11/1970 | Nelson | 364/200 |
| 3,588,829 | 6/1971 | Boland et al. | 364/200 |
| 3,800,286 | 3/1974 | Brown et al. | 364/200 |
| 3,840,862 | 10/1974 | Ready | 364/200 |
| 3,845,474 | 10/1974 | Lange et al. | 364/200 |
| 3,896,419 | 7/1975 | Lange et al. | 364/200 |
| 4,056,844 | 11/1977 | Izumi | 364/200 |
| 4,092,713 | 5/1978 | Scheuneman | 364/200 |
| 4,095,269 | 6/1978 | Kawabe et al. | 364/200 |
| 4,142,234 | 2/1979 | Bean et al. | 364/200 |
| 4,167,782 | 9/1979 | Joyce et al. | 364/200 |
| 4,168,541 | 9/1979 | DeKarske | 365/230 |
| 4,169,284 | 9/1979 | Hogan et al. | 364/200 |
| 4,181,937 | 1/1980 | Hattori et al. | 364/200 |
| 4,197,580 | 4/1980 | Chang et al. | 364/200 |
| 4,228,503 | 10/1980 | Waite et al. | 364/200 |
| 4,314,331 | 2/1982 | Porter et al. | 364/200 |

Primary Examiner—Jerry Smith
Assistant Examiner—Mark P. Watson
Attorney, Agent, or Firm—Antonelli, Terry & Wands

[57] ABSTRACT

A fast cache flush mechanism includes, associated with the cache, an auxiliary portion (termed a flush count memory) that references a flush counter during the addressing of the cache. This flush counter preferably has a count capacity of the same size as the number of memory locations in the cache. Whenever the cache is updated, the current value of the flush counter is written into the location in the flush count memory associated with the memory location in the cache pointed to by an accessing address, and the valid bit is set.

Whenever it is desired to flush the cache, the contents of the flush counter are changed (e.g. incremented) to a new value which is then written as the new cache index into the location of the flush count memory associated with that flush count, and the associated valid bit is cleared or reset. Any access to the cache by the address requires that the cache index in the associated flush count memory location match the current contents of the flush counter and that the valid bit be set. When the cache is flushed by the above procedure, these conditions cannot be fulfilled, since the current contents of the flush counter do not match any cache index or the valid bit has been reset. As a result, for each addressed memory location that has not been accessed since the last cache flush command (corresponding to the latest incrementing of the flush counter), the total contents of that memory location (i.e. data, cache index and validity bit) are updated in the manner described above. Through this procedure, once the contents of the flush counter have recycled back to a previous value, it is guaranteed that each memory location in the cache will have been flushed and, in many instances, updated with valid data.

25 Claims, 13 Drawing Figures

| | MEMORY ADDRESS LOCATION | DATA | KEY | (CACHE INDEX) FLUSH COUNT | VALID BIT | FLUSH COUNTER | STATUS |
|---|---|---|---|---|---|---|---|
| FIG. 2A. | 3(11)<br>2(10)<br>1(01)<br>0(00) | —<br>—<br>—<br>— | —<br>—<br>—<br>— | 3(11)<br>2(10)<br>1(01)<br>0(00) | 0<br>0<br>0<br>0 | 0 | I<br>I<br>I<br>I |
| FIG. 2B. | 3<br>2<br>1<br>0 | —<br>—<br>—<br>— | —<br>—<br>—<br>— | 0<br>0<br>0<br>0 | 1<br>1<br>1<br>1 | 0 | V<br>V<br>V<br>V |
| FIG. 2C. | 3<br>2<br>1<br>0 | —<br>—<br>—<br>— | —<br>—<br>—<br>— | 0<br>0<br>1<br>0 | 1<br>1<br>0<br>1 | 1 | I<br>I<br>I<br>I |
| FIG. 2D. | 3<br>2<br>1<br>0 | —<br>—<br>—<br>— | —<br>—<br>—<br>— | 1<br>0<br>1<br>0 | 1<br>1<br>0<br>1 | 1 | V<br>I<br>I<br>I |
| FIG. 2E. | 3<br>2<br>1<br>0 | —<br>—<br>—<br>— | —<br>—<br>—<br>— | 1<br>0<br>1<br>0 | 1<br>1<br>1<br>1 | 1 | V<br>I<br>V<br>I |
| FIG. 2F. | 3<br>2<br>1<br>0 | —<br>—<br>—<br>— | —<br>—<br>—<br>— | 1<br>2<br>1<br>0 | 1<br>0<br>1<br>1 | 2 | I<br>I<br>I<br>I |
| FIG. 2G. | 3<br>2<br>1<br>0 | —<br>—<br>—<br>— | —<br>—<br>—<br>— | 1<br>2<br>2<br>0 | 1<br>0<br>1<br>1 | 2 | I<br>I<br>V<br>I |
| FIG. 2H. | 3<br>2<br>1<br>0 | —<br>—<br>—<br>— | —<br>—<br>—<br>— | 1<br>2<br>2<br>2 | 1<br>0<br>1<br>1 | 2 | I<br>I<br>V<br>V |
| FIG. 2I. | 3<br>2<br>1<br>0 | —<br>—<br>—<br>— | —<br>—<br>—<br>— | 3<br>2<br>2<br>2 | 0<br>0<br>1<br>1 | 3 | I<br>I<br>I<br>I |
| FIG. 2J. | 3<br>2<br>1<br>0 | —<br>—<br>—<br>— | —<br>—<br>—<br>— | 3<br>2<br>2<br>2 | 1<br>0<br>1<br>1 | 3 | V<br>I<br>I<br>I |
| FIG. 2K. | 3<br>2<br>1<br>0 | —<br>—<br>—<br>— | —<br>—<br>—<br>— | 3<br>3<br>2<br>2 | 1<br>1<br>1<br>1 | 3 | V<br>V<br>I<br>I |
| FIG. 2L. | 3<br>2<br>1<br>0 | —<br>—<br>—<br>— | —<br>—<br>—<br>— | 3<br>3<br>2<br>0 | 1<br>1<br>1<br>0 | 0 | I<br>I<br>I<br>I |

FAST CACHE FLUSH MECHANISM

FIELD OF THE INVENTION

The present invention relates to data processing systems and, more particularly, to a scheme for effecting a rapid flush of the contents of a cache memory.

BACKGROUND OF THE INVENTION

Present day data processing systems commonly employ cache memories for expediting processing execution that avoids reference to main memory. As such, the data stored in the cache is subject to frequent modification either by the same or by a different user process, so that the data in cache for one process may be invalid for another user process. For example, in the event of a context switch or a process switch, it is desirable to flush the cache, since the logical addresses within a single user process are unique, but can be duplicated between two processes. In the past, cache flush schemes have involved the scanning of each memory location in the cache and individually clearing each valid bit. Examples of schemes for clearing or flushing cache memories using this conventional technique are described in the U.S. Pat. No. 3,800,286; to Brown Lange et al. U.S. Pat. Nos. 3,845,474; Ready 3,840,862; Lange et al. 3,896,419 and Lange et al. 3,979,726. Unfortunately, the time involved in executing a separate cycle through the cache for each storage location, in order to flush the cache, is considerable and reduces processing speed.

SUMMARY OF THE INVENTION

In accordance with the present invention, there is provided an enhanced-speed cache flushing mechanism which avoids the slow, tedious task of individually clearing each valid bit in the cache, as in the case of the conventional cache flush procedure. Instead, pursuant to the present invention, the cache is augmented by an auxiliary portion (termed a flush count memory) that references a flush counter during the addressing of the cache. This flush counter preferably has a count capacity of the same size as the number of memory locations in the cache. Whenever the cache is updated, the current value of the flush counter is written into the location in the flush count memory associated with the memory location in the cache pointed to by an accessing address, and the valid bit is set.

Whenever it is desired to flush the cache, the contents of the flush counter are changed (e.g. incremented) to a new value which is then written as the new cache index into the location of the flush count memory associated with that flush count, and the associated valid bit is cleared or reset. Any access to the cache by the address requires that the cache index in the associated flush count memory location match the current contents of the flush counter and that the valid bit be set. When the cache is flushed by the above procedure, these conditions cannot be fulfilled, since the current contents of the flush counter do not match any cache index except one whose valid bit has been reset. As a result, for each addressed memory location that has not been accessed since the last cache flush command (corresponding to the latest incrementing of the flush counter), the total contents of that memory location (i.e., data, cache index and validity bit) are undated in the manner described above. Through this procedure, once the contents of the flush counter have recycled back to a previous value, it is guaranteed that each memory location in the cache will have been flushed and, in many instances, updated with valid data.

By virtue of the cache flush mechanism described briefly above, the present invention enjoys a processing speed capability not achieved in accordance with conventional schemes. The cache flush mechanism does not require the clearing of each cache location in response to a flush command; yet invalid data is always replaced by valid data when the memory location in cache containing the invalid data is accessed. As a result, the increase in processing speed becomes especially noticeable over a system operation span during which a number of flush commands have been issued. In conventional mechanisms this would require the same lengthy process of clearing or flushing (e.g. by resetting the valid bit) of every cache memory location in response to each successive flush command. According to the present invention, it is simply a matter of changing the contents of the flush counter and resetting the valid bit for only a single memory location. This one procedure automatically dictates that all present data is invalid without the need to reset each valid bit. During subsequent accessing of the cache, it is highly unlikely (although certainly possible) that each and every memory location will be referenced prior to the next flush command. This means that those locations that were not referenced need not be individually flushed, since their associated cache index does not match the contents of the flush counter, so that a reference to any of such locations is advised that the data is invalid. It will be readily appreciated, therefore, that the cache flush mechanism according to the present invention saves considerable processing time.

BRIEF DESCRIPTION OF THE DRAWINGS

FIGS. 2A-2L illustrate various exemplary states of portions of the cache and flush counter of FIG. 1 for facilitating a description of the operation of the cache flush mechanism of FIG. 1.

DETAILED DESCRIPTION

Figure 1:
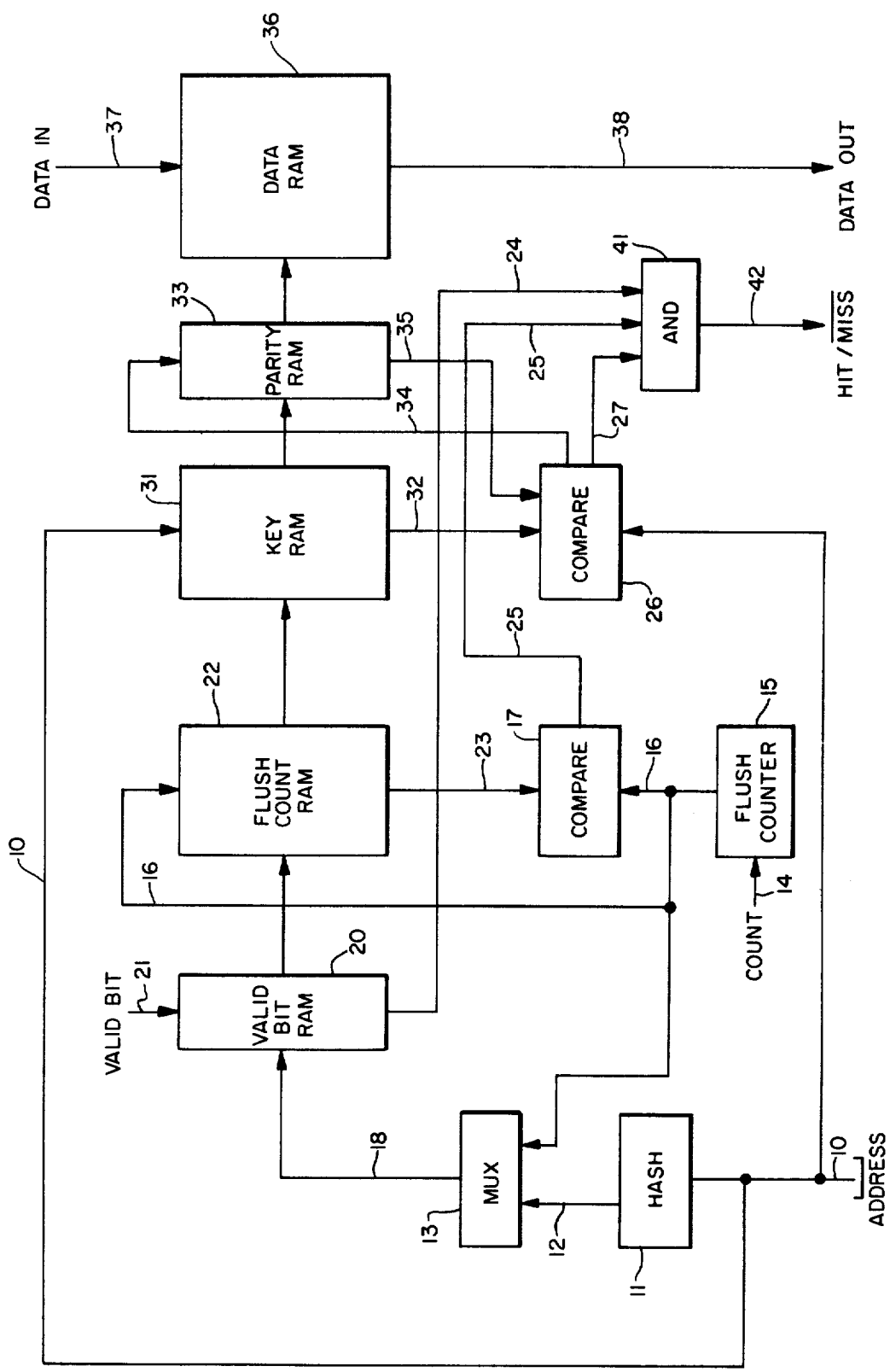
FIG. 1 is a schematic block diagram of a cache flush mechanism in accordance with the present invention.

Before describing in detail, the particular improved cache flush mechanism in accordance with the present invention, it should be observed that the present invention resides primarily in a novel structural combination of conventional computer circuits, and not in the particular detailed configurations thereof. Accordingly, the structure, control and arrangement of these conventional computer circuits have been illustrated in the drawings by readily understandable block representations, which show only those specific details that are pertinent to the present invention, in order not to obscure the disclosure with structural details which will be readily apparent to those skilled in the art having the benefit of the description herein. In addition, various control lines within the electronic data processing system have been appropriately consolidated and simplified in order to emphasize those portions that are most pertinent to the present invention. Thus, the block diagram illustration of the invention does not necessarily represent the mechanical structural arrangement of the exemplary system, but is primarily intended to illustrate the major structural components of the system in a convenient functional grouping, whereby the present invention can be more readily understood.

Referring now to FIG. 1 of the drawings, there is shown a block diagram of portions of a cache memory and associated cache flush mechanism within an electronic data processing system in accordance with the present invention. For purposes of the present description, the cache memory shown in FIG. 1 may be assumed to be an instruction cache (although the invention is not so limited) to be accessed (i.e. both write and read capability) by user address commands.

The basic components of the cache memory shown in FIG. 1 include a data portion comprised of a random access memory (RAM) 36, a key memory portion comprised of an RAM 31, a valid bit memory portion 20 and a parity memory portion 33. In accordance with the present invention, the cache also includes a flush count RAM 22 which, in conjunction with flush counter 15, provides the above-referenced simplified, but rapid, flush count mechanism for the cache memory. Access to the cache is obtained by an address link 10 coupled to a comparator 26, an address-to-cache memory converter or HASH 11, and key portion RAM 31. Link 10 is a multi bit link containing the address of the memory location within the cache to be accessed. Data is written in and read out from the data portion RAM 31 by way of multibit links 37 and 38, respectively. It is to be observed that each of RAMS 20, 22, 31, 33 and 36 has the same number of memory locations, although the size of each memory location for the respective RAMS is different in correspondence with the size of the information to be stored therein. For example, valid bit RAM may be a lk×1 memory while RAM 36 may have a capacity of lk×32 locations. It should be noted here that the read/write control lines for the respective memory portions of FIG. 1 have been omitted in order to simplify the drawing.

As mentioned above, the incoming logical address is converted to a cash memory address by converter 11. This converter, commonly known in the art as a HASH, converts (or folds) the address or link 10 into a memory address in cache in accordance with a prescribed algorithm. Typically, the algorithm is implemented by combinational logic and a detailed description thereof will not be presented here as such algorithms are well known and, per se, do not require a detailed description for an understanding of the present invention. For a memory capacity of lk (more specifically 1024) words, HASH converts the incoming multi bit (e.g. 24 or 32 bits) logical address on link 10 into a smaller sized (e.g. 10 bit) address and applies this address over link 12 to multiplexer 13. Multiplexer 13 selectively couples the output of HASH 11 or flush counter 15 to link 18, thereby concurrently addressing each of RAMS 20, 22, 31, 33 and 36. Thus, the converted cache address is coupled over link 18 for accessing the same memory address in each of the associated memory portions.

Address link 10 is further coupled to a comparator 26, which compares the address accessing the cache over link 10 with the address contents of the key portion memory 31 accessed by the converted cache address coupled over link 18. As long as these two addresses match, and parity is properly defined, comparator 26 provides a "one" output over link 27 to an AND gate 41. It should be noted that parity is defined by a parity memory 33 the output of which is coupled over link 35 to comparator 26. Address link 10 is also coupled as an input to key portion RAM 31 to be loaded into the memory location addressed by link 18 during a write operation.

The crux of the present invention involves a flush counter 15 and associated flush count memory 22 together with a comparator 17. Flush counter 15 preferably has a count capacity corresponding to the size of the memory; in the present example being discussed, counter 15 may be a ten bit counter to encompass the 1024 locations in memory. However, the count capacity of flush counter 15 may be smaller than the memory capacity of the cache. In this circumstance, during a flush operation, to be explained in detail below, a plurality of locations in cache are affected by each change in the contents of the flush counter. Counter 15 is controllably incremented by a count signal supplied from a processor control line 14. The output of counter 15 is a multibit (10 in the example chosen) link 16 which is coupled to one input of a comparator 17 and the write input of flush count memory 22. Link 16 is further coupled as an input to multiplexer 13. Multiplexer 13 is selectively controlled by an external signal line (not shown). During initialization, in the manner to be described below, multiplexer 13 couples the ten bit word on link 16 to address link 18 for sequentially loading respective successive flush counts into the successive addresses of flush count memory 22. During a flush operation, multiplexer 13 couples the changed (incremented) contents of flush counter 15 to the address link 18 so that the new flush count may be written into the memory location in flush count memory 22 defined by the flush counter 15 and the valid bit in the corresponding memory location in valid bit memory 20 may be reset.

Comparator 17 compares the contents of the memory location of flush count memory 22, as defined by the address on link 18, coupled over link 23 with the contents of the flush counter 15 coupled over link 16. As long as these two counts match, the output of comparator 17 on link 25, coupled as a second input to AND gate 41, is high. When the count values do not match, the state of link 25 goes low.

A third input to AND gate 41 is coupled over link 24 to the output of valid bit memory 20. Like the other memory portions of the cache, valid bit memory 20 is accessed by the address on link 18. Valid bit information may be written into memory 20 by way of link 21 in accordance with an external process or control signal, not shown.

As long as each of the outputs of the addressed portion of valid bit memory 20, comparator 17 and comparator 26 are high, AND gate 41 produces a high output on link 42 indicating that the contents of the memory location accessed by the addresses on link 10 are valid. Unless the state of each of lines 24, 25 and 27 is high, the output of AND gate 41 goes low, indicating that the currently accessed memory location in the cache does not contain valid data.

In order to facilitate a complete understanding of the manner of operation of the cache flush mechanism shown in FIG. 1, the description to follow will reference FIGS. 2A–2L which, in a simplified manner, show the contents of valid bit memory 20, flush count memory 22, flush counter 15 and an indication as to whether the data in the memory location being accessed is valid or not. In this regard, in order to simplify the drawing the size of each memory is assumed to contain only four locations (0–3) rather than 1024, described above. It will be readily appreciated, however, that the description applies equally to a cache memory of any size taking into consideration, of course, the fact that the numbers will have to increase to properly describe a memory of such an increased size.

Since the contents of the memory location of the data portion 36, parity memory 33 and key portion 31 do not require a detailed explanation for purposes of understanding the present invention, they are not shown in FIGS. 2A-2L.

Prior to describing the flush operation, consider the manner in which the cache operates upon system initialization and subsequent accessing of memory locations for writing-in and reading out valid data. Referring to FIG. 2A, at initialization, multiplexer 13 is controlled so as to selectively couple link 16 to address link 18. Flush counter 15 is initially cleared and the state of valid bit input line 21 is clamped at 0. Under these conditions, cache address link 18 is pointing to the zero location in memory. In response to a write instruction supplied to the cache, the contents of flush counter 15, namely zero, are coupled as a data input to flush count memory 22 and as an address, pointing to the location in memory in which this zero quantity is to be written. Thus, a zero is written into the location in memory 22 whose address is (00) and the clamped zero valid bit is also written into the zero location in valid bit memory 20. At this time, the contents of the other memory sections are irrelevant and need not be described here. Next, flush counter 15 is incremented from zero to one (01) and the same procedure of writing the contents of the flush counter into the flush count memory 22, while loading a zero or non-valid bit identifier into memory location number 1 (01) of valid bit memory 20 takes place. This scenario is repeated for all remaining memory locations so as to sequentially load each location in the flush count memory with data corresponding to its memory location as identified by its associated count within the flush counter 15. This is shown in FIG. 2A where, for a four memory location cache, successive memory location addresses contain corresponding flush counts zero (00)-three (11). Each location in valid bit memory 20 is set at zero, also. Upon rollover of the flush counter 15, the operation is terminated and the system is now ready to be accessed and loaded with valid data. At this time, since the valid bit of each memory location is a zero, the status of the data is, necessarily, invalid, as indicated in FIG. 2A. Multiplexer 13 is now switched to couple link 12 to link 18.

With initialization having been completed, instruction requests which reference the cache are handled in accordance with normal processor operation and the address portion is coupled over link 10. The contents of the key portion are accessed in response to the hashing of the address, while the flush count in memory 22 is compared with the flush count in counter 15 (zero at this time) and the valid bit is supplied to AND gate 41. Since all of the valid bits are initially zero, AND gate 41 will indicate that for the instruction of interest, the data contained in the cache is invalid and must be updated. Thus, new data is coupled over link 37 to be loaded into ram 36 while the address on link 10 is written into memory 31. At the same time, in accordance with the present invention, whenever new data is written into memory, the contents of the flush counter 15 are loaded into the memory location of the flush count memory 22 identified by the word on the address link 12-18. Since the state of the flush counter 15, subsequent to memory initialization, is normally reset at zero, a zero (00) will be loaded in that memory location of flush count memory 22 accessed by the contents of address link 18. At the same time, the state of valid bit line 21 goes high, indicating that the new or updated data presently being written into the cache for the memory location of interest is valid. This operation continues as the cache is accessed and valid data is written into the cache. For purposes of the present explanation, let it be assumed that during the present cache access operation, each of the four memory locations of interest is loaded with new data so that the content of each memory location is valid. Namely, the zero contents (00) of the flush counter 15 are loaded into each of the four memory locations of the flush count memory, so that its cache index is zero, as shown in FIG. 2B. The valid bit for each memory location is 1, also shown in FIG. 2B, so that the status of each memory location will be that it contains valid data.

As the cache is accessed by subsequent instructions, the cache is read and the contents of the key portion are compared with the address on link 120. The flush count or cache index within flush count memory 22 is compared with the current contents of the flush counter and the valid bit is checked. All of these operations are carried out by comparators 17 and 26 and AND gate 41, as mentioned above. If the address equals the contents of the key portion within memory 31, the cache index count within memory 22 equals the contents of flush counter 15 and the valid bit is set, then the contents of the data portion of the cache contains the instruction and a hit is indicated by AND gate 41. On the other hand, if the address on link 10 is not equal to the accessed contents of key memory 31 or the cache index as read out of memory 22 is not equal to the contents of the flush counter 15, or the valid bit is a zero, namely reset, AND gate 41 will indicate that a miss has occurred and the cache will be updated by rewriting the new address and new data into the cache for the new instruction to be loaded as a valid instruction. In addition to writing the new address into the key portion 31 and the data portion of the instruction into memory 36, the contents of the flush counter, coupled over link 16, are also written into the location in the flush count memory 22 identified by the contents of address link 18. Also, the valid bit for this address location is set in valid bit memory 20. As pointed out above, this is shown in FIG. 2B where it has been presumed that the operation proceeds for every memory location so that there is valid data in each of the four memory locations in the cache.

Consider now the case when a flush command is issued during processor operation. When the cache is to be flushed, all that needs to be done is to change the contents of the flush counter by a value which changes its present value. This is most simply done by incrementing the counter by a value of 1. In the example being described, the current contents of the flush counter are incremented from zero (00) to one (01) as shown in FIG. 2C. At the same time the new counter 15 contents are written into the location pointed to by the counter 15, namely, in the example chosen, the new counter contents (of the value 1) are loaded into memory location 1 within flush count RAM 22 and that valid bit for memory location 1 in memory 20 is reset or cleared. This is shown in FIG. 2C where nothing has happened as far as memory locations 0, 2 and 3 are concerned, but the above operation changes the contents of cache location number 1. Since the contents of the flush counter 15 must match the contents of any memory location in flush count RAM 22 that is accessed and the valid bit must be set for whatever memory location is accessed, in order for the data to be valid, it can be seen that because of the above operation, all of the data within the cache is now invalid, as indicated by the status column in FIG. 2C. Namely, through a simple mechanism of incrementing a counter and writing the contents of the flush counter into the memory location identified thereby, while resetting the valid bit for that location, no other operation is required to indicate that all of the instructions within the cache are presently invalid.

Subsequently, let it be assumed that the next instruction is to be fetched from the cache location number 3. Since, as shown in FIG. 2C the cache index, namely the contents of memory location number 3 within flush count memory 22, does not match the flush counter 15, AND gate 41 indicates a miss on output line 42. As a result, the contents of the memory location pointed to by the address on link 10, namely the third memory location, are updated by writing new data into the third memory location within data memory 36 and the address is written into the third memory location of key portion memory 31. At the same time, the current contents of the flush counter, namely the value 1, is written into the third location in the flush count memory 22 and the valid bit for that memory location within valid bit memory 20 is set to a 1. This is shown in FIG. 2D, so that within the cache, the contents of the third memory location have been rendered valid, while the contents of the other memory locations remain invalid.

FIG. 2E shows a subsequent access to fetch an instruction from memory location number 1. At this time, the cache index value matches the current contents of the flush counter, since the current contents of the flush counter were previously loaded into memory location number 1, as shown in FIG. 2C. However, the valid bit was previously cleared, so that the data in this memory location is invalid. Thus, new data is written into memory location number 1 of data portion memory 36 and the address on link 10 is loaded into memory location number 1 of key portion memory 31. Also, the valid bit is set and the current contents of the flush counter 15, which happen to match the cache index for memory location number 1 within flush count memory 22, are loaded into that location, namely they remain unchanged. With this operation having taken place, the contents of memory locations numbers 1 and 3 are currently valid while those of locations numbers zero and 2 are invalid, as shown in FIG. 2E.

Let it now be assumed that another cache flush command is issued, as shown in FIG. 2F. Again, as noted previously, a flush command is implemented by incrementing the flush counter and resetting a single valid bit. Here, the value of the flush counter changes from 1 (01) to 2 (10) and the value 2 is loaded into the address pointed to by the flush counter 15. Multiplexer 13 is controlled to couple link 16 to address link 18, so that the value of the flush counter 15 may be written into the memory location of flush count memory 22 pointed to by the contents of the flush counter. The valid bit for memory location number 2 is cleared, so that the resultant contents of the cache index and the validity bit are as illustrated in FIG. 2F. Since all of the memory locations, save memory location number 2 within flush count memory 22, have a cache index value that is different from the flush counter 15, and since for memory location number 2 the validity bit has been cleared, the output of AND gate 41 must necessarily be zero, so that the data contained in each memory location in the cache is invalid.

The multiplexer is now switched back to couple the output 12 of HASH 11 to cache address link 18 and a new address for fetching a new instruction is coupled to the cache. Let it be assumed, as shown in FIG. 2G that the new address points to memory location number 1. Since the current cache index for memory location number 1 within the flush count memory 22 does not equal the current contents 2 (10) of the flush counter 15, AND gate 41 indicates a miss and the data within memory location number 1 is updated. Namely, a new address is written into memory location number 1 of key portion memory 31 and new data is written into the memory location number 1 of data portion memory 36. Also, the current contents (2) of the flush counter 15 are loaded or written into memory location number 1 within flush count memory 22 and the valid bit for this location is set at 1, as shown in FIG. 2(G). Thus, the contents of the first location in the cache are now valid.

Let it be assumed that the next memory location accessed is memory location number zero. Again, since the cache index value of memory location zero does not match the contents of the flush counter, the data in this memory location is invalid and this memory location must be updated as shown in FIG. 2H. Once the memory location is updated as shown in FIG. 2H, the data is valid.

Let it once more be assumed that a new flush request is supplied to the cache, so that again the flush counter 15 is incremented to a new value of 3(11). As shown in FIG. 2H, the cache index value of each of each of the memory locations within the flush count memory 22 does not currently match the current contents (3) of the flush counter 15, so that all of the data contained in the cache must be invalid. Multiplexer 13 is now controlled to couple the contents of the flush counter 15 over link 16 and link 18 to address the third memory location in the cache to load the new contents (3) of the flush counter 15 into the third memory location in the flush count memory 22. This is shown in FIG. 2I wherein the cache index of the third memory location is changed from a two (10) to a three (11). Its valid bit is also set to a zero at this time, as noted above. As a result, the status of all of the data in the cache is currently invalid, since memory locations zero through two have a cache index value which does not match the flush counter 15 and the valid bit of that one memory location which does match the contents of the flush counter, namely memory location 3, has been reset.

FIGS. 2J and 2K show subsequent instruction fetch operations where the third and second memory locations in the cache are accessed by the contents of the address supplied over link 10. From the explanation above in conjunction with FIGS. 2A–2G, it can be seen that for memory locations numbers 2 and 3 valid data is written into the cache, namely the cache is updated and the valid bits associated with these memory locations are set. Of course, the cache index is also made equal to the contents of the flush counter, (i.e. 3) at this time.

Next, let it be assumed that a further flush command is issued, as shown in FIG. 2L. The contents of the flush counter now rollover to its original value of zero and the cache index of memory location number zero is set to the current value of the flush counter, namely zero, and the valid bit of the zero location in memory is cleared. Again, through this operation the status of each location in memory is that of invalid data.

A significant aspect of the additional flush command shown in FIG. 2L, namely that associated with the rollover of the flush counter, is the fact that once the flush counter has gone through a complete cycle, it is guaranteed that the contents of every memory location in the cache have been cleared of the data contained therein at the time the contents of the flush counter were previously at its present value. This effect is achieved in conventional schemes by conducting a sequential flush operation for each memory cell in response to each flush command. In accordance with the present invention, however, as can be seen from the foregoing explanation and the illustration in FIGS. 2A-2L, it is not necessary to conduct an individual validity bit reset operation for each memory cell in response to a flush command. Instead, by the provision of the flush counter and the associated flush count memory in the cache, it is guaranteed that the desired effect of flushing each memory cell is obtained, yet a considerable amount of time which is expended in conventional schemes is saved.

In the foregoing description, it was assumed that the count capacity of flush counter 15 corresponded to the number of memory locations in the cache. However, the count capacity of flush counter 15 may be less than that of the size of memory. In this modification, whenever a flush command is issued, a plurality of locations in the flush count RAM 22 have their contents replaced by the new contents of flush counter 15 and the corresponding valid bits in RAM 20 are reset. For example, if flush counter 15 has a count capacity of eight bits (i.e. 256), and the cache is a 1K memory, then, in response to a flush command, the next four consecutive locations in flush count RAM 22, beginning with the location determined by the new contents of flush counter 15 would be updated to the new count, and the corresponding valid bits of RAM 20 would be cleared. The lowest numbered location in flush count RAM 22 for the next group of four locations to be affected may be obtained simply by multiplying the contents of flush counter 15 by a factor (here 4) relating the size of the cache to the capacity of flush counter 15.

It should also be noted that in place of using separate valid bit RAM 20 and flush count RAM 22, shown in FIG. 1, the capacity of flush count RAM may be increased by an extra bit (for the valid bit) while eliminating RAM 20. There, in place of both the 10bit (1K) flush count RAM 22 and 1bit (1K) valid bit RAM 20, a single 11 bit (1K) RAM 22 may be employed, with the valid bit data occupying the LSB and the flush count data referencing the 10MSBs. The LSB of RAM 22 would be coupled to AND gate 41, while the 10MSBs would be coupled to comparator 17, as in the embodiment shown in FIG. 1.

While we have shown and described various embodiments in accordance with the present invention, it is understood that the same is not limited thereto but is susceptible to numerous changes and modifications as known to those skilled in the art and we therefore do not wish to be limited to the details shown and described herein but intend to cover all such changes and modifications as are encompassed by the scope of the appended claims.

What is claimed is:

1. For use in a data processing system having a cache in which information to be employed during the operation of said system may be stored and accessed, an arrangement for controlling the validity of the information stored within said cache comprising:
   a first memory section, respective memory locations of which are associated with respective cache memory locations in which said information is stored in the cache;
   a second memory section for storing data representative of whether or not information contained in the respective cache memory locations in which said information is stored in the cache is valid information;
   first means for storing a reference code, the value of which is selectively variable;
   second means, responsive to a request to store valid information in a selected cache memory location, for storing, in the associated memory location in said first memory section, the reference code stored by said first means and for storing, in the associated memory location in said second memory section, data representative of the validity of said information;
   third means, coupled to said first and second memory sections and to said first means, and responsive to a request to access valid information stored in a selected cache memory location, for comparing the contents of the associated memory location in said first memory section with the reference code stored by said first means, and for generating an output indicative that the information stored in said selected cache memory location is invalid in response to a mismatch between the contents of the associated memory location in said first memory section and said reference code stored by said first means or in response to the data contained in the associated location in said second memory section representing that the information is invalid; and
   fourth means, responsive to a request to render invalid all information stored in said cache, for changing the reference code stored by said first means.

2. An arrangement according to claim 1, wherein said fourth means includes means for storing said changed reference code in the memory location of said first memory section identified by the reference code stored by said first means and for causing the data in the associated memory location in said second memory section to be representative that the information stored in the associated memory location in the cache memory is invalid.

3. An arrangement according to claim 1, wherein said fourth means includes means for storing said changed reference code in a plurality of memory locations of said first memory section associated with the reference code stored by said first means and for causing the data in associated memory locations in said second memory section to be representative that the information stored in the associated memory locations in the cache memory is invalid.

4. An arrangement according to claim 3, wherein said first means comprises a binary counter a prescribed number of N bits in size.

5. An arrangement according to claim 4, wherein said cache memory contains $M \times 2^N$ cache memory locations.

6. An arrangement according to claim 1, wherein said first means comprises a counter and said fourth means comprises means for causing the counter to count in a prescribed direction, thereby changing its contents and said reference code.

7. An arrangement according to claim 6, wherein said fourth means comprises means for incrementing the contents of said counter to a new reference code.

8. An arrangement according to claim 7, wherein said fourth means includes means for causing the changed reference code to be stored in the memory location of said first memory section identified by said change reference code and for causing the data in the associated memory location in said second memory section to be representative that the information stored in the associated memory location in the cache memory is invalid.

9. An arrangement according to claim 8, wherein
said request to access valid information stored in said selected cache memory location comprises an address access code for accessing data from said selected cache memory location;
said arrangement further includes a third memory section, respective memory locations of which are associated with the respective cache memory locations in which said information is stored in the cache and contain memory address codes respectively associated with said cache memory locations; and
said third means includes means for comparing said address access code with the memory address code stored in the memory location of said third memory section associated with said selected cache memory location and generating an output indicative that the information stored in said selected cache memory location is invalid in response to a mismatch between said address access code and said memory address code.

10. An arrangement according to claim 9, wherein said third means includes means for generating an output indicating that the information stored in said selected cache memory location is valid in response to:
a match between the contents of said associated memory location in said first memory section and the reference code stored by said first means and a match between said address access code and said memory address code; and
the data contained in the associated location in said second memory section representing that the information is valid.

11. An arrangement according to claim 10, wherein said address access code comprises an address and wherein said arrangement further includes fifth means for converting said address into a memory location selection code through which associated memory locations of said first, second and third memory sections and said cache memory are addressed.

12. An arrangement according to claim 6, wherein said counter is a binary counter a prescribed number N bits in size.

13. An arrangement according to claim 12, wherein said cache memory contains $2^N$ cache memory locations.

14. An arrangement according to claim 13, wherein said second memory section comprises a validity bit memory section having a $2^N$ storage locations respectively associated with said $2^N$ cache memory locations.

15. An arrangement according to claim 14, wherein said first memory section comprises an $(N+1) \times 2^N$ memory, the N most significant bits of cache memory address of which being associated with said data corresponding to the reference code stored by said counter, and the least significant bit of each memory address corresponding to the validity of said second memory section.

16. An arrangement according to claim 14, wherein said first memory section comprises an $N \times 2^N$ memory, the N bits of each memory address being associated with said data corresponding to the reference code stored by said counter.

17. For use in a data processing system having a cache in which information to be employed during the operation of said system may be stored and accessed, an arrangement for controlling the validity of the information stored within said cache comprising:
a first memory section, respective memory locations of which are associated with respective cache memory locations in which said information is stored in the cache;
a second memory section for storing data representative of whether or not information contained in the respective cache memory locations in which said information is stored in the cache is valid information;
first means for storing a reference code, the value of which is selectively variable;
second means, responsive to a request to store valid information in a selected cache memory location, for storing, in the associated memory location in said first memory section, the reference code stored by said first means and for storing, in the associated memory location in said second memory section, data representative of the validity of said information;
third means, coupled to said first and second memory sections and to said first means, and responsive to a request to access valid information stored in a selected cache memory location, for comparing the contents of the associated memory location in said first memory section with the reference code stored by said first means, and for generating an output indicative that the information stored in said selected cache memory location is invalid in response to a mismatch between the contents of the associated memory location in said first memory section and said reference code stored by said first means or in response to the data contained in the associated location in said second memory section representing that the information is invalid; and wherein
said request to access valid information stored in said selected cache memory location comprises an address access code for accessing data from said selected cache memory location;
said arrangement further includes a third memory section, respective memory locations of which are associated with the respective cache memory locations in which said information is stored in the cache and contain memory address codes respectively associated with said cache memory locations; and
said third means includes means for comparing said address access code with the memory address code stored in the memory location of said third memory section associated with said selected cache memory location and generating an output indicative that the information stored in said selected cache memory location is invalid in response to a mismatch between said address access code and said memory address code.

18. An arrangement according to claim 17, wherein said third means includes means for generating an output indicating that the information stored in said selected cache memory location is valid in response to:
- a match between the contents of said associated memory location in said first memory section and the reference code stored by said first means and a match between said address access code and said memory address code; and
- the data contained in the associated location in said second memory section representing that the information is valid.

19. An arrangement according to claim 17, wherein said address access code comprises an address and wherein said arrangement further includes fourth means for converting said address into a memory location selection code through which associated memory locations of said first, second and third memory sections and said cache memory are addressed.

20. An arrangement according to claim 17, wherein said arrangement further includes fourth means, responsive to the output of said third means indicating that the information stored in said selected cache memory location is invalid, for causing said address access code to be stored in the memory location of said third memory section associated with said selected cache memory location.

21. An arrangement according to claim 20, wherein said fourth means includes means for updating the information stored in said selected cache memory location in response to the output of said third means indicating that the information stored in said selected cache memory location is invalid.

22. An arrangement according to claim 21, wherein said arrangement further includes fifth means, responsive to the output of said third means indicating that the information stored in said selected cache memory location is invalid, for causing said address access code to be stored in the memory location of said third memory section associated with said selected cache memory location.

23. An arrangement according to claim 22, wherein said fourth means includes means for updating the information stored in said selected cache memory location in response to the output of said third means indicating that the information stored in said selected cache memory location is invalid.

24. An arrangement according to claim 23, wherein said fourth means includes means for causing said second memory section to store data representative that said updated information is valid.

25. For use in a data processing system having a cache in which information to be employed during the operation of said system may be stored and accessed, an arrangement for controlling the validity of the information stored within said cache comprising:
- a first memory section, respective memory locations of which are associated with respective cache memory locations in which said information is stored in the cache;
- a second memory section for storing data representative of whether or not information contained in the respective cache memory locations in which said information is stored in the cache is valid information;
- first means for storing a reference code, the value of which is selectively variable;
- second means, responsive to a request to store valid information in a selected cache memory location, for storing, in the associated memory location in said first memory section, the reference code stored by said first means and for storing, in the associated memory location in said second memory section, data representative of the validity of said information;
- third means, coupled to said first and second memory sections and to said first means, and responsive to a request to access valid information stored in a selected cache memory location, for comprising the contents of the associated memory location in said first memory section with the reference code stored by said first means, and for generating an output indicative that the information stored in said selected cache memory location is invalid in response to a mismatch between the contents of the associated memory location in said first memory section and said reference code stored by said first means or in response to the data contained in the associated location in said second memory section representing that the information is invalid; and
- fourth means for updating the information stored in said selected cache memory location in response to the output of said third means indicating that the information stored in said selected cache memory location is invalid.

* * * * *